Feb. 23, 1937.  J. P. ANDERSON  2,071,490
COUPLING MECHANISM
Filed Aug. 22, 1933  3 Sheets-Sheet 3
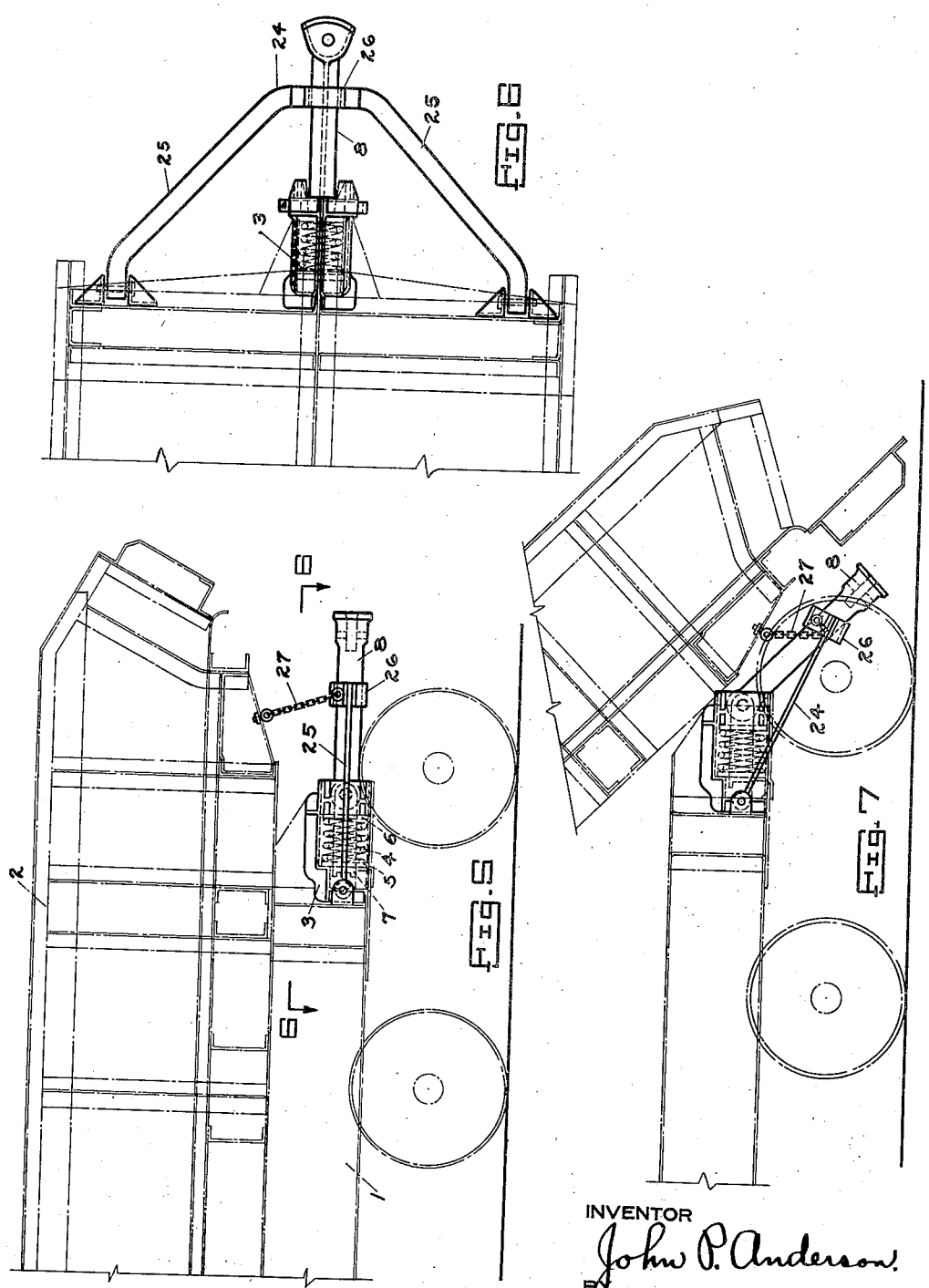
INVENTOR
John P. Anderson
BY
E.S. Utter
ATTORNEY Patented Feb. 23, 1937

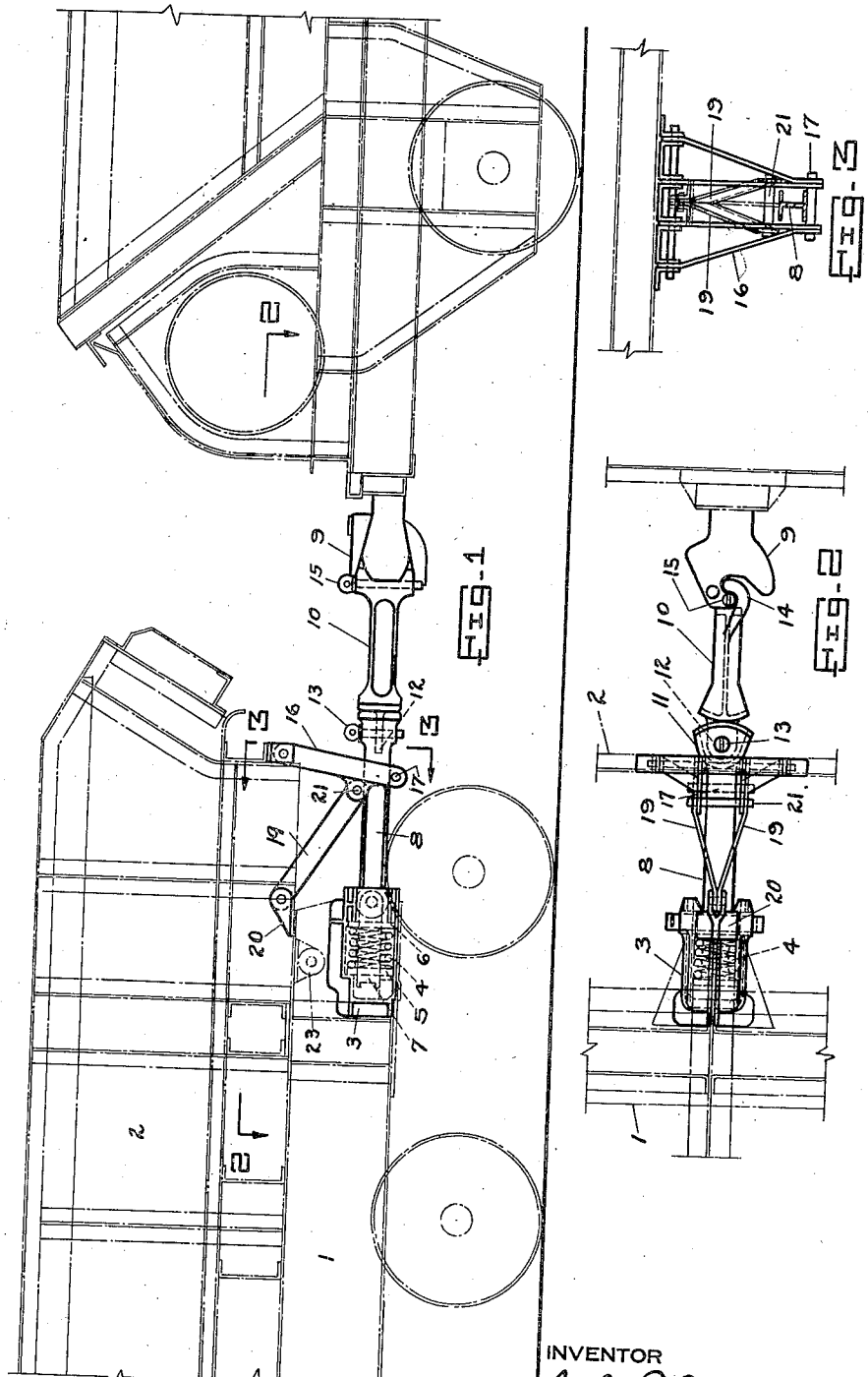

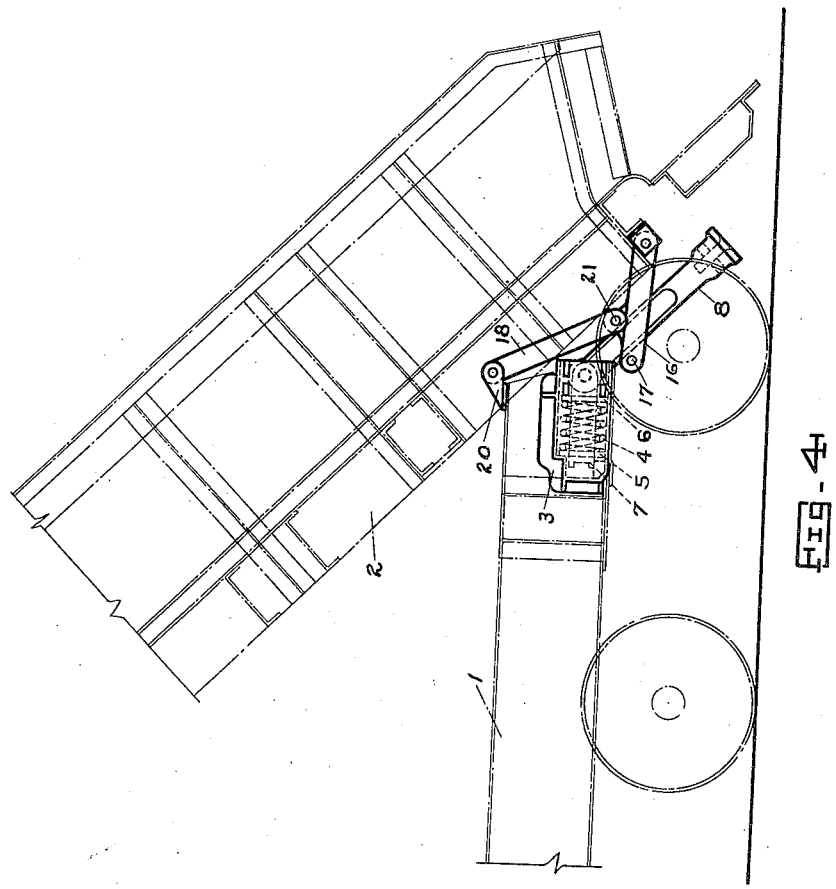

2,071,490

UNITED STATES PATENT OFFICE 2,071,490

COUPLING MECHANISM

John P. Anderson, Koppel, Pa., assignor to Koppel Industrial Car and Equipment Company, Koppel, Pa., a corporation of Pennsylvania Application August 22, 1933, Serial No. 686,229

4 Claims. (Cl. 105—261)

This invention pertains to end dump vehicles such as are adapted to run on rails or highways and particularly to a coupling mechanism for connecting several of said vehicles into a train.

An object of the invention is to provide a coupling mechanism for an end dump vehicle having an overhanging body.

Another object of the invention is to provide a means for lowering the coupling mechanism of an end dump vehicle out of the way of the body as the body moves in dumping over the end of the vehicle chassis.

Another object of the invention is to provide a coupling mechanism of the class described which may be used for effecting a coupling between cars of varying end contours.

In the drawings forming a part of this specification Fig. 1 shows in elevation the end portions of two dump vehicles connected by a coupler; Fig. 2 is a plan view of a portion of Fig. 1; Fig. 3 is a section taken along the lines 3—3 of Fig. 1; Fig. 4 shows the car of Fig. 1 in dump position; Fig. 5 shows in elevation a modification of my invention; Fig. 6 is a plan view along lines 6—6 of the modification shown in Fig. 5; and Fig. 7 shows the car of Fig. 5 in dump position.

Referring now in detail to the drawings where like reference characters refer to like parts, reference character 1 indicates the underframe or chassis of a vehicle having a body 2 mounted on the underframe overhanging the end thereof and pivotally connected to the underframe for tilting about the end thereof. It is to be understood that such a body may be provided with either a hinged end door or a removable end door.

In vehicles of the character described the bodies are usually mounted to overhang the end of the vehicle underframe or chassis. The amount of overhang of the body bearing a definite relation to the height of the body from the rail or highway upon which the vehicle moves. This relation is further complicated by whether the end of the body is provided with a hinged door or a removable door. Vehicles of this type are usually handled individually; however, in some classes of work, particularly in connection with end dump railway cars where the cars are moved considerable distance from their loading point to their discharging point it is advantageous to connect a number of the cars together to form a train so as to reduce the cost of handling. It will be obvious from an inspection of the drawings that the ordinary type of coupling mechanism in use on railway cars, when placed beneath the body of the type of a car herein shown and described, would seriously interfere with the movement of the body in dumping. To provide for this movement of the body it is proposed to hinge the drawbar to move in a vertical plane so as to permit the drawbar to move downwardly out of the way of the tilting body as the body moves in dumping.

In the preferred form of coupler as shown in Fig. 1 of the drawings a housing member 3 is secured to the end of the underframe beneath the body having a chambered interior in which is mounted a draft spring 4 having front and rear follower blocks 5 and 6 with abutments on the housing engaging the follower blocks, a yoke 7 within the housing and comprising a U-shaped member having a connecting arm engaging the rear follower block and having the free ends of the arms projecting beyond the chambered opening for connection to a drawbar 8 which is pivotally mounted in the yoke. The drawbar preferably extends beyond the lower outer end of the body and has the usual head to engage with the standard head of a standard coupler 9 mounted in the front end of the adjacent car, it being understood that cars of this type are usually provided with but one coupler at the blind end or front end of the car and the end over which the body moves in dumping is ordinarily not provided with a coupler.

In many cases where the blind end of the car is provided with a platform the standard coupler projects sufficiently beyond the end of the platform to move beneath the dumping end of an adjacent car to connect with the drawbar of the invention and the platform provides clearance for the overhanging end of the first car and prevents interference between the two car bodies. In cases where one of the cars being coupled together is not provided with a platform on the blind end, it is proposed to place a reacher bar 10 in the end of the drawbar 8 of the invention, which reacher bar extends beyond the end of the car and provides the necessary clearance between the two cars.

Where a reacher bar is used the end of the drawbar 8 of the invention is changed to provide a bell head 11 such as is shown in Fig. 2 of the drawings. Such a head has an inwardly extending chamber providing a close fit in a vertical direction for the end 12 of the reacher bar fitting within the chamber and is flanged outwardly in a transverse direction to permit transverse movement of the reacher bar as the coupled cars move in negotiating curves in the track. A coupling pin 13 is inserted through the bell head and the projection 12 on the reacher bar extending within the chamber so as to connect the drawbar and reacher bar. The free end of the reacher bar is then provided with a suitably shaped head 14 to engage the standard coupling of the adjacent car and a coupling pin 15 in the standard head fastens the end of the reacher bar in place.

In order to maintain the drawbar of the invention in operative position whilst the cars are in transit, it is proposed to provide a support for the drawbar. As shown in Fig. 1 of the drawings this support comprises a yoke depending from the underside of the body adjacent the end thereof and formed of the members 16. Connecting the members 16 is a pin 17 upon which the drawbar 8 rests. This pin is made removable so as to be able to remove the drawbar from the car. To control the movement of the yoke supporting the drawbar as the body moves in dumping, a guide 18 is connected to the underframe adjacent the underside of the body and connected to the supporting yoke arms 16 so that as the body moves in dumping the guide 18 moves the yoke 16 inwardly beneath the drawbar and permits the drawbar to move downwardly, out of the way of the tilting body. This guide comprises a pair of arms 19 pivotally mounted at one end to a bracket 20 secured to the underframe center sill and at the other ends of the arms connected to the yoke 16 by means of the pin 21.

It will be obvious from an inspection of the drawings that as the body pivots about the trunnion 23 secured to the underframe, the outer end of the body carries the yoke 16 downward. The arms 19 of the guide 18 are rigid and pivotally connected to the yoke 16 and the underframe 1. Thus the arms 19 cause the yoke 16 to move inwardly of the drawbar 8. This change of support for the drawbar 8 allows it to move down out of the way of the tilting body. As the car body is righted the yoke 16 is again swung outwardly and upwardly carrying the drawbar 8 with it to operative position.

A modification of the invention is shown in Figs. 5 to 7 of the drawings in which the support for the drawbar comprises a U-shaped yoke 24 having diverging arms 25 connected to the underframe on opposite sides of the draft housing 3 and extending outwardly from the underframe beneath the drawbar 8. It is preferably in this construction to provide a collar 26 which encircles the drawbar 8 and a flexible member 27 is connected between this collar and the car body to maintain the drawbar in operative position when the cars are in transit. Such a flexible member is usually a chain to permit relative movement between the drawbar supporting yoke and the underside of the car body as the body moves in dumping.

The operation of the modification as the body moves in dumping is similar to that of the preferred form of the invention. The yoke 24 being pivoted to move in a vertical plane, as the body moves downward the yoke moves downward carrying the drawbar 8 with it and out of the way of the body. As the body is righted the pull on the member 27 raises the yoke 24 and consequently the drawbar 8 to operative position.

Having thus described the invention what I claim as new and desire to secure by Letters Patent is:

1. In a dump vehicle including an underframe, a body supported thereon with one end overhanging the underframe and a pivotal connection between the body and underframe, a drawbar and buffing member pivotally mounted on the underframe, a support depending from the overhanging end of the body engaging beneath the drawbar adjacent the outer end thereof, and a member pivotally mounted on the underframe and said depending support.

2. In a vehicle of the class described, including an underframe, a body tilting about one end thereof, a drawbar pivotally connected to said end of the underframe and projecting outwardly thereof, a support depending from the body and engaging the drawbar on opposite vertical sides and adjacent the outer end thereof to limit lateral movement of the drawbar and to effect a positive downward movement of the drawbar as the body moves in dumping.

3. In a vehicle of the class described, including an underframe, a body tilting about one end thereof, a drawbar pivotally connected adjacent the end of the underframe and projecting outwardly thereof, a support depending from the body and engaging the drawbar on opposite vertical sides and adjacent the outer end thereof to limit lateral movement of the drawbar and to effect a positive downward movement of the drawbar as the body moves in dumping, and guide means pivotally connected to the underframe and pivotally associated with said support.

4. In a vehicle of the class described, including an underframe, a body tilting about one end thereof and having a portion overhanging the underframe, a drawbar pivotally connected to the end of the underframe and extending outwardly beneath the overhanging portion of the body, guide means on the underframe limiting lateral movement of the drawbar and guiding the drawbar in movement about its connection to the underframe, and means connected with the overhanging portion of the body and operatively associated with the drawbar, and said guide means to support the drawbar in operative position when the body is horizontal.

JOHN P. ANDERSON.